(12) United States Patent
Yim

(10) Patent No.: US 8,045,427 B2
(45) Date of Patent: Oct. 25, 2011

(54) APPARATUS FOR OPTICAL PICK-UP

(75) Inventor: Boo Bin Yim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 1055 days.

(21) Appl. No.: 11/783,981

(22) Filed: Apr. 13, 2007

(65) Prior Publication Data
US 2007/0242574 A1 Oct. 18, 2007

(30) Foreign Application Priority Data

Apr. 18, 2006 (KR) .................. 10-2006-0034999

(51) Int. Cl.
*G11B 7/00* (2006.01)
*G11B 7/135* (2006.01)

(52) U.S. Cl. ............ 369/44.37; 369/112.03; 369/112.12
(58) Field of Classification Search ............. 369/112.05, 369/112.06, 112.11, 112.12
See application file for complete search history.

(56) References Cited

U.S. PATENT DOCUMENTS

| 5,446,565 | A | * | 8/1995 | Komma et al. | 369/44.23 |
|---|---|---|---|---|---|
| 6,108,283 | A | * | 8/2000 | Fujita et al. | 369/44.23 |
| 7,064,898 | B1 | * | 6/2006 | Takasuka et al. | 359/566 |
| 2002/0075775 | A1 | * | 6/2002 | Katayama | 369/44.37 |
| 2002/0126588 | A1 | * | 9/2002 | Katayama | 369/44.23 |
| 2007/0189130 | A1 | * | 8/2007 | Anzai et al. | 369/44.23 |

FOREIGN PATENT DOCUMENTS

WO WO 2006027955 A1 * 3/2006

* cited by examiner

*Primary Examiner* — Joseph Haley
*Assistant Examiner* — Nicholas Lee
(74) *Attorney, Agent, or Firm* — Harness, Dickey & Pierce

(57) ABSTRACT

An optical pickup includes a light source configured to emit light, a beam splitter configured to transmit or reflect light, an object lens configured to condense the light transmitted by the beam splitter onto an optical storage, and a diffraction grating having a first grating pattern and a second grating pattern. The first grating pattern is configured to diffract and divide the light reflected by the optical storage into a main beam and two sub beams. The second grating pattern is configured to diffract the light along a different diffracting direction than the first grating pattern. A condensing lens is configured to generate astigmatism to the light diffracted by the first grating pattern, and a light sensor is configured to receive the light via the condensing lens and detect a tracking error signal.

2 Claims, 12 Drawing Sheets

APPARATUS FOR OPTICAL PICK-UP

The present application claims priority under 35 U.S.C. 119 and 35 U.S.C. 365 to Korean Patent Application No. 10-2006-0034999, filed on Apr. 18, 2006, which is hereby incorporated by reference in its entirety.

BACKGROUND OF THE INVENTION

1. Field of the Invention

The present invention relates to an apparatus for optical pickup and more particularly, to an apparatus for optical pickup which minimizes offset element occurring between the recorded and non-recorded pattern when object lenses are configured off-axis along the tracks on the optical storage medium is disclosed.

2. Description of the Related Art

Optical storage media such as optical disks optically record data and are in shape of palm-size disk. Those media are loaded on a driver for data to be recorded thereto or to be read therefrom by optical apparatus inside the driver.

There exist various optical storage media, for example, CD (Compact disc), DVD (Digital Versatile Disc), BD (Blu-ray Disc). Also, there are sub groups of DVD, such as DVD-RW, DVD+RW, DVD-RW. The kinds of those media are increasingly diversifying.

In prior arts, various technologies have been developed to trace the track and groove on the optical storage media. Among those technologies, one uses three beams to trace the track and groove. In this case, especially when the three branched-off beams are located off-axis along the tracking direction, there is a problem that offset elements will occur over large areas near the boundary of recording and non-recording pattern of the optical storage media.

In making such various image sensors, efforts are being made to improve these image sensors.

SUMMARY OF THE INVENTION

The present invention relates to an apparatus for optical pickup which effectively minimizes offset elements without being affected by the difference between the times when the beams enter the recording and non-recording area and the difference between the positions where the object lenses are located when those beams are located off-axis along the inner tracks and outer tracks.

Advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve at least one of these objects and other advantages and in accordance with the purpose of the invention, as embodied and broadly described herein, an embodiment of an optical pickup includes a light source configured to emit light, a beam splitter configured to transmit or reflect light, an object lens configured to condense the light transmitted by the beam splitter onto an optical storage, and a diffraction grating having a first grating pattern and a second grating pattern. The first grating pattern is configured to diffract and divide the light reflected by the optical storage into a main beam and two sub beams. The second grating pattern is configured to diffract the light along a different diffracting direction than the first grating pattern. A condensing lens is configured to generate astigmatism to the light diffracted by the first grating pattern, and a light sensor is configured to receive the light via the condensing lens and detect a tracking error signal.

In another aspect of the present invention, there is provided a method for manufacturing a CMOS image sensor including the above described optical pickup.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
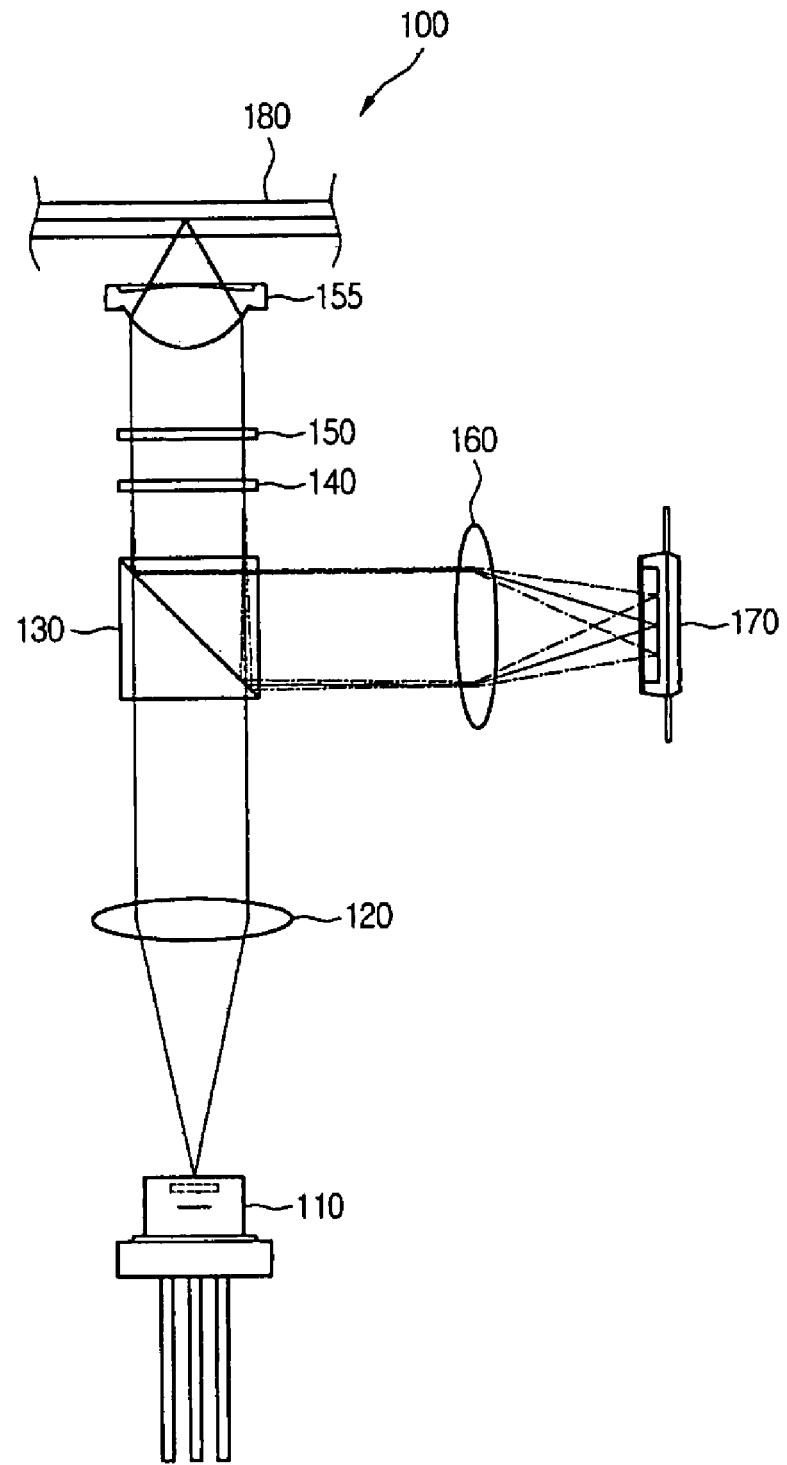
FIG. 1 shows a schematic diagram of an optical pickup 100 according to the first embodiment of the present invention.

FIG. 1 shows an optical pickup 100 according to the embodiment of the present invention.

Referring to FIG. 1, the optical pickup 100 according to the first embodiment of the present invention comprises light source 110, collimate lens 120, beam splitter 130, diffraction grating 140, wavelength plate 150, object lens 155, condensing lens 160 and light detecting means 170, and an optical storage 180 may be placed before the object lens 155.

The light source 110 generate laser beam and the collimate lens 120 transforms the light generated by light source 110 into a parallel beam.

The beam splitter 130 which is a light dividing means transmits the incident light from collimate lens 120 depending on the polarizing direction of the light or reflects the light reflected by the optical storage 180 to the condensing lens 160.

The transmission light through beam splitter 130 passes through the diffraction grating 140 and then is transformed to a circularly polarized light by quarter wavelength plate 150.

The circularly polarized light passes through the object lens 155 and is reflected by the optical storage 180 having land and groove structure and goes back to the object lens 130.

The reflected light is transformed to a parallel beam by the object lens 130 and then is polarized by quarter wavelength 150 so that its polarizing direction is reversed. And then the light is diffracted by the diffraction grating 140.

Figure 3:
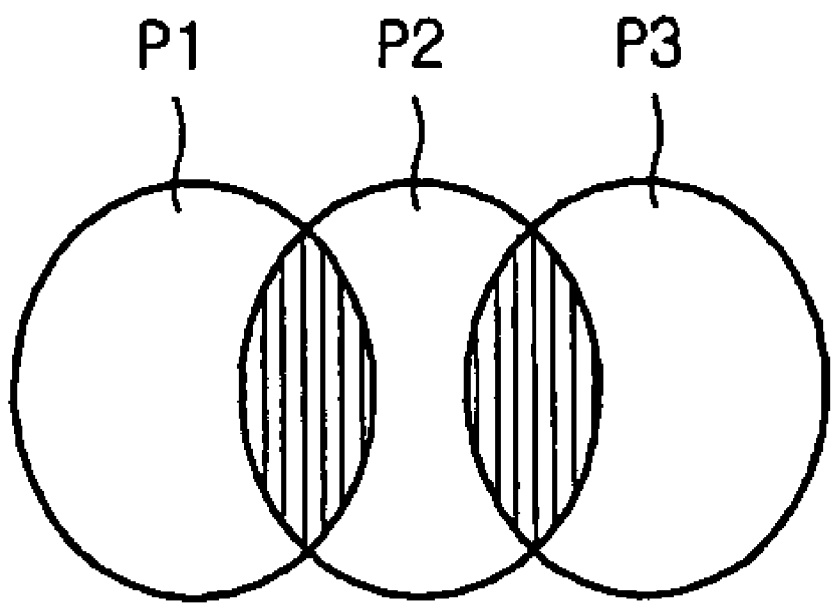
FIG. 3 shows a baseball pattern.

The diffraction grating 140 diffracts and divides the reflected light by the optical storage 180 into a main beam and two sub beams, in which the diffracted lights of main beam and sub beams form a baseball pattern as shown in FIG. 3.

The diffraction grating 140 comprises two grating pattern regions which have different polarization direction from each other. The first grating pattern performs diffracting and dividing of the reflected light by the optical storage and excludes the AC signal causing area i.e. the region which the sub beam region and the main beam region overlap. The second grating pattern covers the region which the sub beam region and the main beam region overlap and diffracts the lights to a direction different from case of the first grating pattern. The diffracted light by the second grating pattern does not enter the light detecting means and is excluded from error detecting process.

The detailed structures of the diffraction grating 140 will be described below with reference to FIG. 4 and the following drawings.

The main beam divided out by the diffraction grating 140 is the $0^{th}$ beam and is detected as an MPP signal at the light detecting means 170, the sub beams thereof are +1st beam and −1st beam and are detected as first SPP signal and second SPP signal at the light detecting means 170 respectively.

The diffracted light from the diffraction grating 140 is reflected by beam splitter 130 and transmits to the light detecting means 170 via condensing lens 160.

The light detecting means 170 is a light-to-electrical conversion device such as Photo Diode, receives $0^{th}$ beam, $+1^{st}$ beam $-1^{st}$ beam and generates MPP signal, first SPP signal and second SPP signal and detects TES (Track Error Signal) therefrom.

Figure 2A:
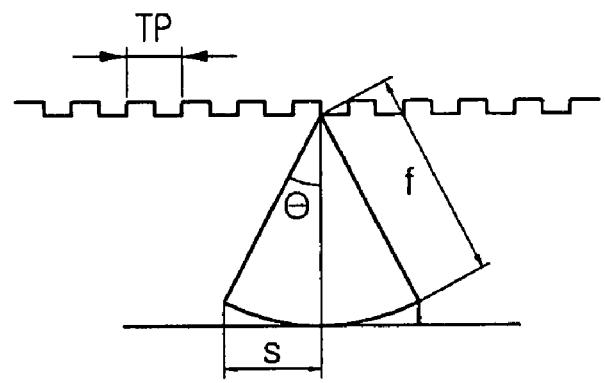
FIG. 2a illustrates the diffraction of light by optical storage and FIG. 2b illustrates formation of a baseball which is formed by diffracted light at the optical storage.

FIG. 2a illustrates the diffraction of light by optical storage.

As shown in FIG. 2a, the incident light into optical storage 180 is diffracted by the track structure of land/groove on the optical storage 180 with a certain angle θ and forms $0^{th}$, $1^{st}$ and $-1^{st}$ beams. And the $0^{th}$ $+1^{st}$ and $-1^{st}$ beams form circular pattern(S).

The size of circular pattern formed by $0^{th}$, $+1^{st}$ and $-1^{st}$ beams may be equivalent to EPD (Entrance Pupil Diameter) of the object lens placed right before the optical storage and can be calculated by the following equation.

$$EPD = 2 \times f \times NA \quad \text{(Equation 1)}$$

Wherein "f" is focal length of object lens,
"NA" is Numerical Aperture.

Figure 2B:
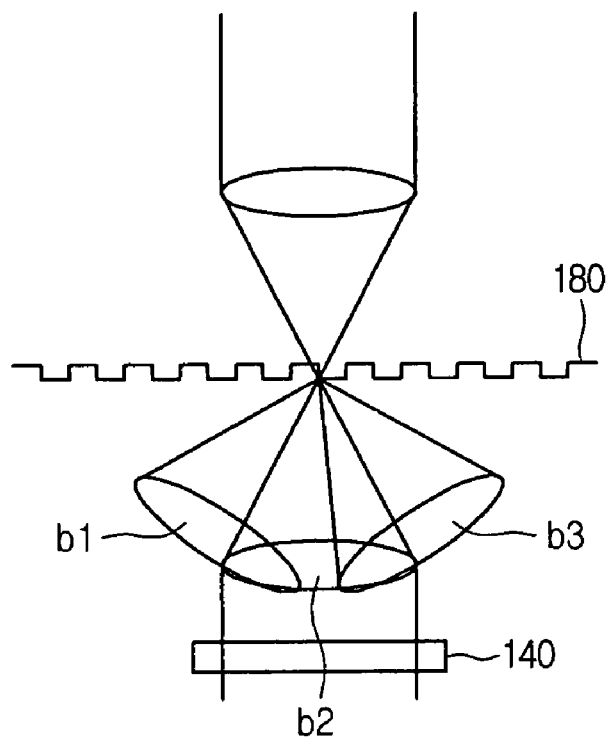

FIG. 2b illustrates forming of a baseball which is formed by diffracted light at the optical storage 180.

As shown in FIG. 2b, when a circular patterned beam is incident into the optical storage 180, it is diffracted to form three beams b1, b2, b3.

The circular patterns formed by side beams b1,b3 are shifted from the central pattern of the central beam b2, wherein the amount of shift can be calculated by the following equation.

$$\text{Shift} = \text{the dimension of the sub beam} \times f \times \lambda \div TP$$

wherein "the dimension of the sub beam is +1 or −1,
"f" is focal length of object lens,
"λ" is the wavelength of the sub beam
"TP" is the track pitch of the optical storage.

Reflected by the optical storage 180, three beams b1, b2, b3 from a baseball pattern as shown in FIG. 3.

The size and overlapping area is dependent upon the kind of the optical storage 180. For example, the overlapping area tends to be relatively large in case of BD (Blu ray disk) or DVD RW.

The baseball pattern P1, P2, P3 formed by reflection at the optical storage 180 is transformed to a parallel beam by object lens 155, and passes through wavelength plate 150 and diffraction grating 140.

Figure 4:
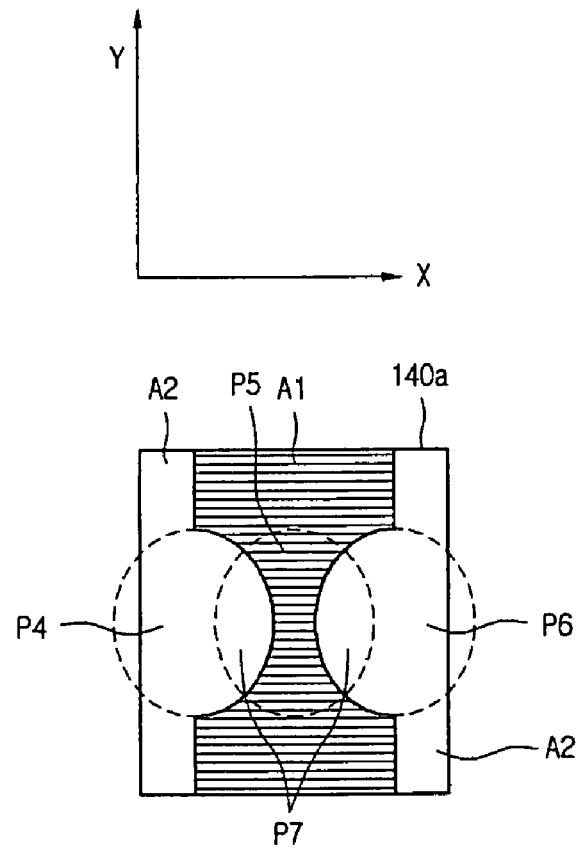
FIG. 4 shows the first embodiment of a diffraction grating according to the present invention.

FIG. 4 shows a plane view of the first embodiment of a diffraction grating according to an embodiment of the present invention, which may be used in the optical pickup 100 in FIG. 1.

In the optical pickup 100 according to one embodiment of the present invention, the structure of diffraction grating 140a is equivalent to circular patterns P1, P2, P3. Beams passing through sub beam ($\pm 1^{st}$ beam) region (P4, P6) and the overlapped region P7 of main beam region P5 and sub beam region P4, P6 are diffracted to other direction than to the light detecting means 170 so that they are excluded from the process of detecting TES signal.

The AC signal is caused by the overlapped region of sub beam region and main beam region. By preventing the AC signal from reaching light detecting means 170, it enhances detecting the accurate TES.

Referring to FIG. 4, assuming Y axis lies along the track direction and x axis lies along the tangential direction, in the diffraction grating 140a, the first grating pattern A1 covers the area except sub beam region and main beam region which overlaps with the sub beam regions and the second grating pattern A2 covers the rest of the diffraction grating 140a.

The second grating pattern A2 prevent the $\pm 1^{st}$ beams from reaching the optical storage, so that AC signal is excluded from the process of detecting TES signal.

Figure 5:
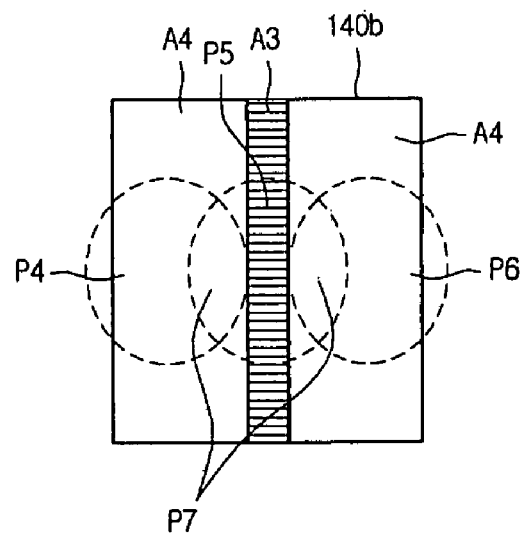
FIG. 5 shows the second embodiment of a diffraction grating according to the present invention.

FIG. 5 shows a plane view of the second embodiment of a diffraction grating according to the present invention which may be used in the optical pickup 100 in FIG. 1.

Referring to FIG. 5, similar to the first embodiment, the second embodiment of diffraction grating 140b comprises the first grating pattern A3 and the second grating pattern A4. The first grating pattern A3 is in the shape of a rectangle, which does not overlap with circular pattern of sub beam P4, P6. The second grating pattern A4 covers the rest of the diffraction grating 140a.

Preferably, one side of the first grating pattern A3 is in contact of the circular pattern of sub beam as shown in the FIG. 5. The width and length of the rectangle is variable within the scope of the present invention.

Figure 6:
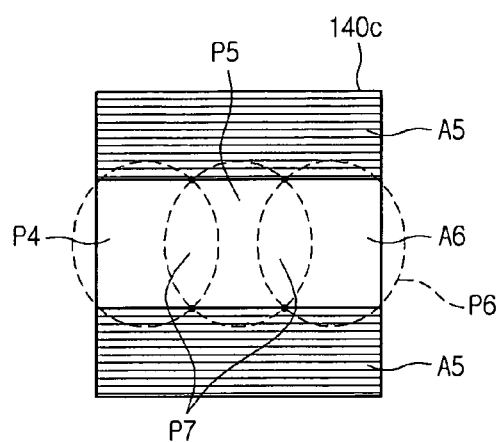
FIG. 6 shows the third embodiment of a diffraction grating according to the present invention.

FIG. 6 shows a plane view of the third embodiment of a diffraction grating according to the present invention which may be used in the optical pickup 100 in FIG. 1.

Referring to FIG. 6, similar to the first embodiment, the third embodiment of diffraction grating 140c comprises the first grating pattern A5 and the second grating pattern A6. The first grating pattern A5 comprises two horizontally long rectangles, each of the rectangles being placed in the top and the bottom respectively.

Similarly, the first grating pattern A5 does not overlap with the circular patterns of sub beams P4, P6 and the second grating pattern A6 covers the rest of the diffraction grating 140a.

The one side of the first grating pattern A5 passes through upper or lower two of four intersection points at which the circular pattern of main beam and those of sub beams. The width and length of the rectangle of the first grating pattern is variable within the scope of the present invention.

Figure 7:
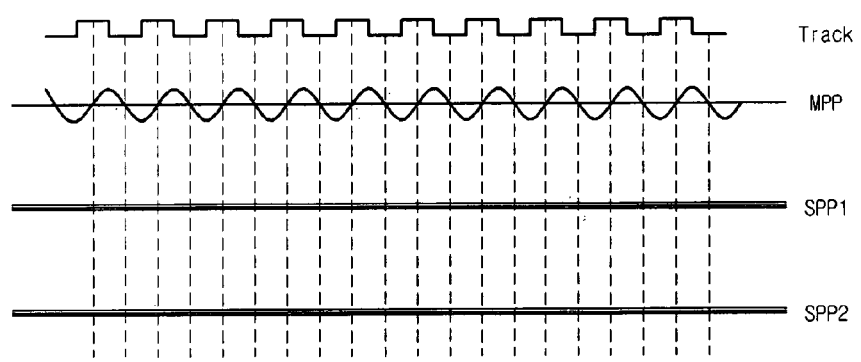
FIG. 7 shows an exemplary push pull signal output which is generated by the diffraction grating of the optical pickup according to the first embodiment of the present invention.

FIG. 7 shows push-pull signals MPP generated by beam $0^{th}$ and shows SPP1 and SPP2 generated by $\pm 1^{st}$ beams after being reflected by track structure on the optical storage and passing through the first, second or third diffraction grating 140a, 140b, 140c of present invention. Note that there is substantially no AC signal in the push-pull signals generated by $\pm 1^{st}$ beam. By transmitting through the diffraction gratings 140a, 140b, 140c of present invention, DC offset is excluded from the signal detected by the light detecting means 170. This will be described with reference to FIG. 9a and the following drawings.

Meanwhile, tracking error level from tracking error signal detected by the light detecting means 170 can be calculated by the following equation. It is noted the tracking error level is improved by the present invention since the AC signal of an SPP signal is excluded before it reaches the optical storage.

Tracking error level=$MPP$ signal−$k$×(the first $SPP1$ signal+the second $SPP$ signal)   (Equation 3)

Wherein "k"=DC level of MPP signal÷(2×DC level of SPP signal)

The first grating patterns A1, A3, A5 just pass the main beam B2 without phase shift, and shift the phase of the sub beams B1, B3, so that the phase-shifted sub beams are excluded from the process of detecting tracking error signal.

The gratings of the second grating patterns A2, A4, A6 have different direction from those of the first grating patterns A1, A3, A5, for example, by 90° so that they can divert a beam towards a certain position other than light detecting means 170.

Figure 8:
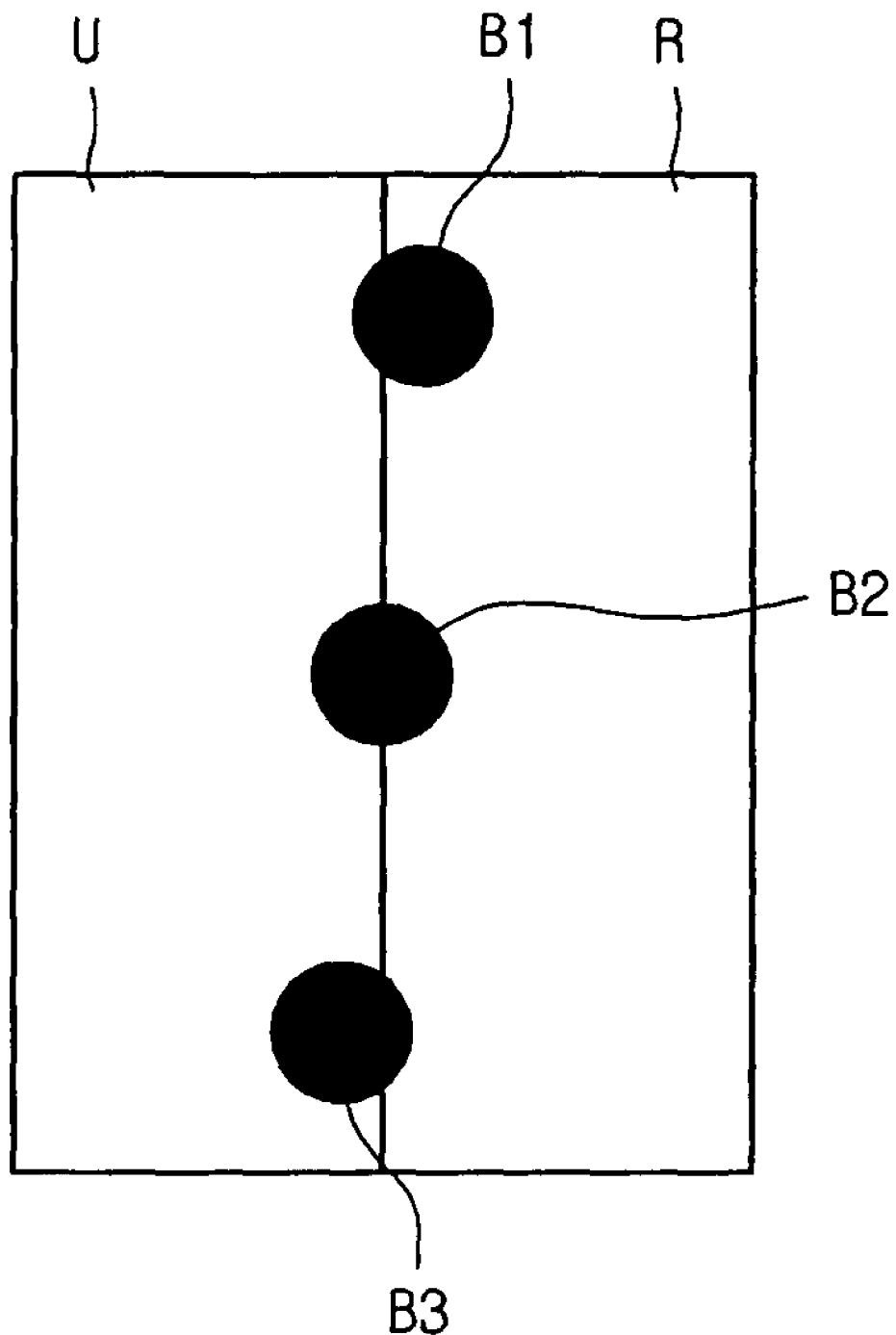
FIG. 8 shows positions where main beam and sub beams reach over the optical storage according to the present invention.

FIG. 8 shows positions where main beam and sub beams reach over the optical storage according to the present invention.

The main beam B2 is on the border line between the unrecorded area U and recorded area R and the sub beams are shifted by about ½ TP from the border line, which corresponds to the track lines on the optical storage.

Figure 9A:
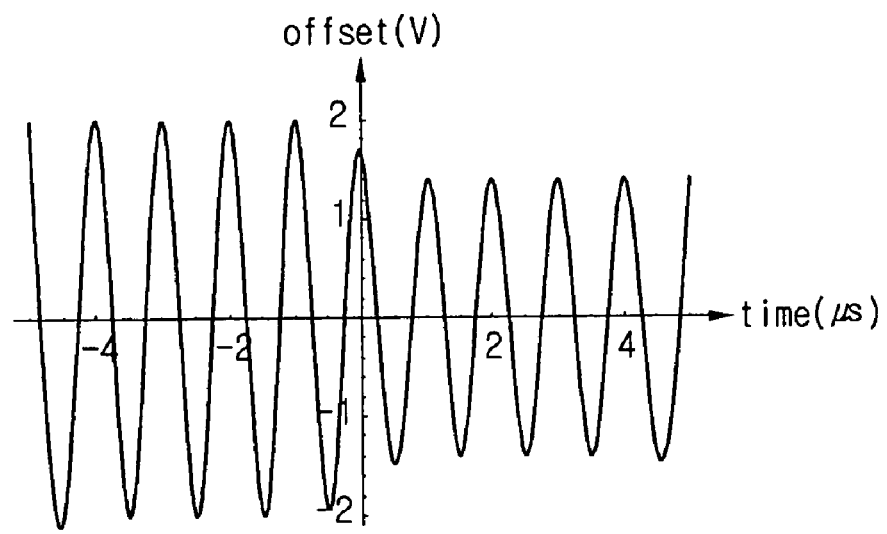
FIG. 9a shows change of offset voltage dependent on time when there is no radial shift of object lens and FIG. 9b shows change of offset voltage dependent on time when there is radial shift of object lens, in both cases the object lenses being placed on-axis.
Figure 9B:
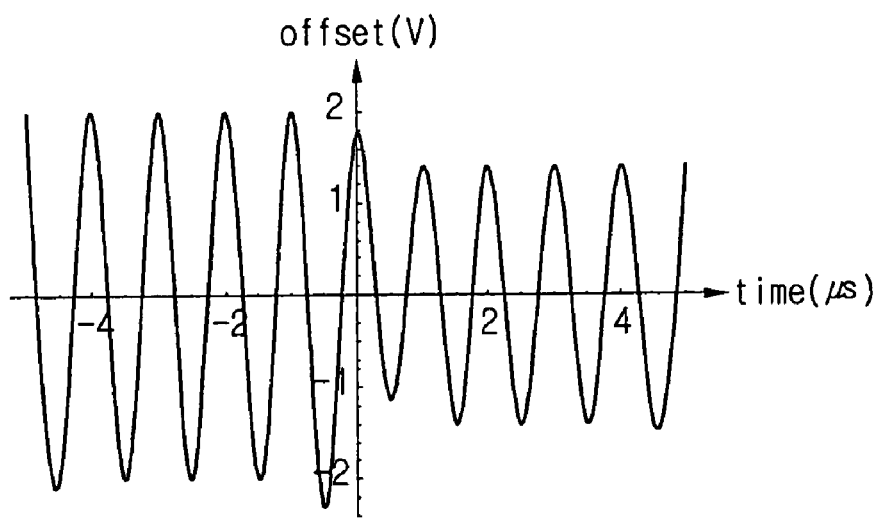

FIG. 9a shows change of offset voltage dependent on time when there is no radial shift of the object lens and FIG. 9b shows change of offset voltage dependent on time when there is radial shift of the object lens, in both cases the object lenses being placed on-axis. Before time=0 along time axis, offset voltage in the unrecorded area is represented, and after time=0 along time axis, offset voltage in the unrecorded area is represented.

The difference between the unrecorded area U and recorded area R appears as a difference of reflection ratio. When applying DDP method using three beams, comparing FIGS. 9a and 9b, there occurs a voltage level difference between the unrecorded area and the recorded area by the radial shift of the object lens, i.e. by moving the object lens over the optical storage.

There is no change of offset voltage level between before and after t=0 when there is no radial shift of the object lens as shown in FIG. 9a, while there occurs a difference of offset voltage level between before and after t=0 when there is radial shift of the object lens as shown in FIG. 9b.

Figure 10:
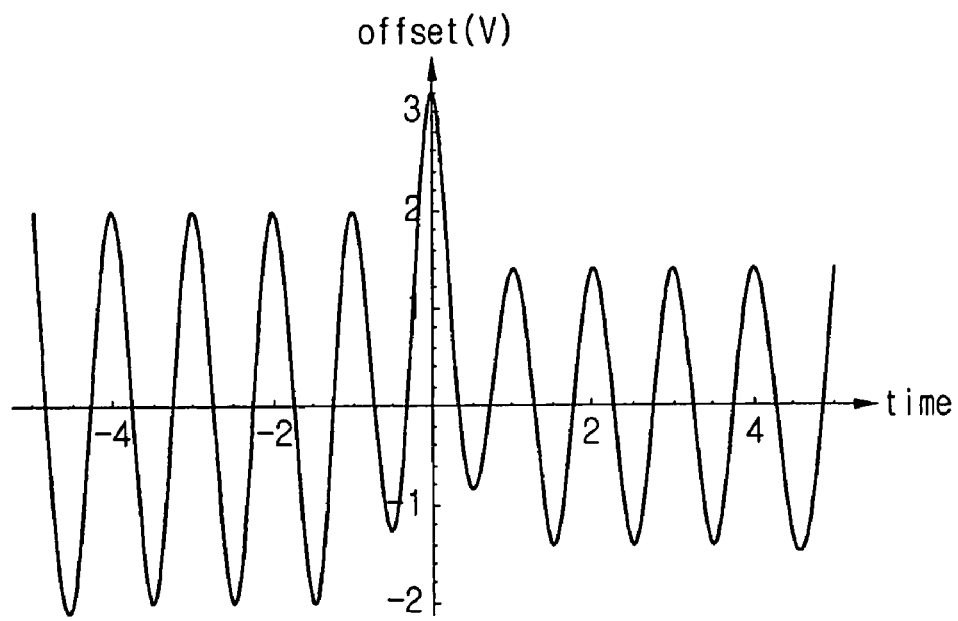
FIG. 10 shows change of offset voltage dependent on time when sub beam error occurred in which the object lenses are placed on-axis.

FIG. 10 shows change of offset voltage dependent on time when sub beam error occurred in which the object lenses are placed on-axis.

In FIG. 10, sub beam error occurred, so that sub beam was de-tracked towards $0^{th}$ beam by 10 TP. As such, offset voltage level change was increased near t=0.

Figure 11:
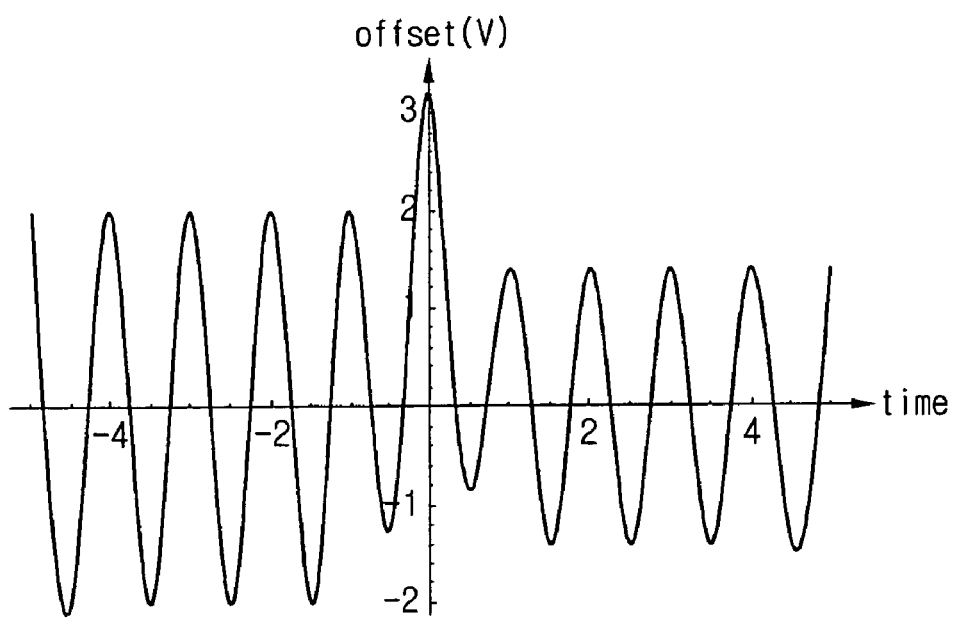
FIG. 11 shows change of offset voltage dependent on time when sub beam error occurred and there is radial shift of object lens in which the object lenses are placed on-axis.

FIG. 11 shows change of offset voltage dependent on time when sub beam error occurred and there is radial shift of object lens in which the object lenses are placed on-axis. Note that offset voltage level change was even more increased near t=0.

Figure 12A:
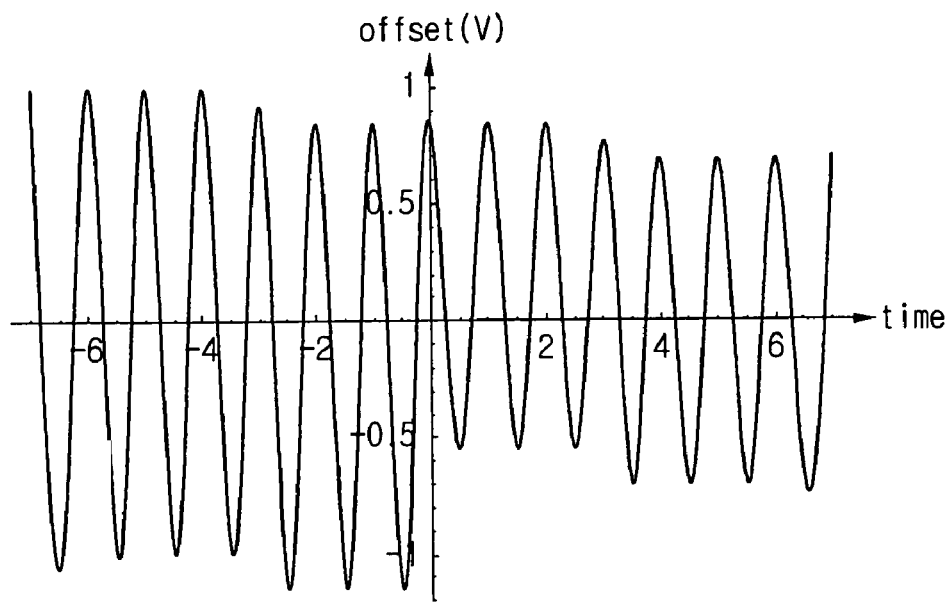
FIGS. 12a and 12b show change of offset voltage dependent on time when there is radial shift of object lens by 1 au and 5 au respectively in which the object lenses are placed off-axis.
Figure 12B:
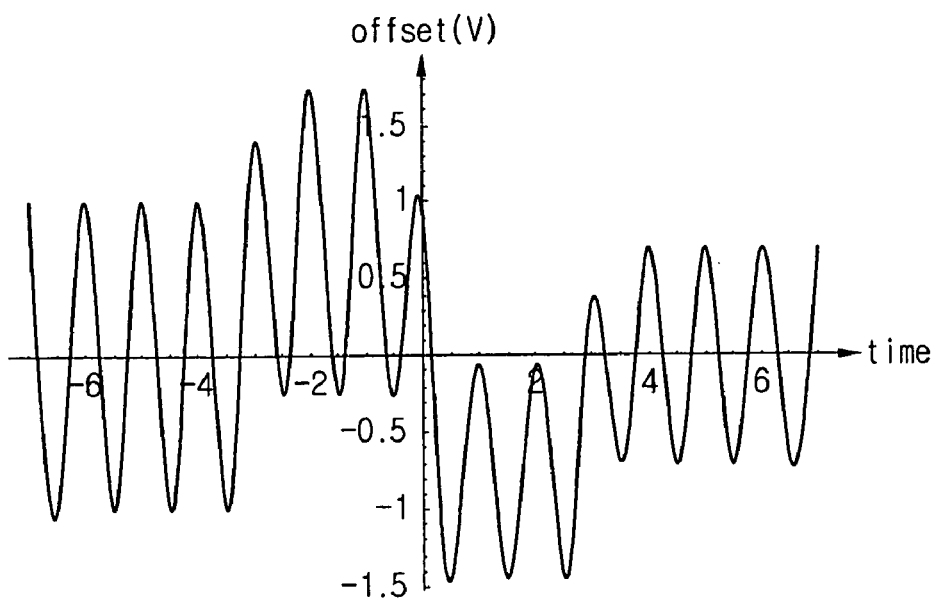

FIGS. 12a and 12b show change of offset voltage dependent on time when there is radial shift of object lens by 1 au (arbitrary unit) and 5 au respectively in which the object lenses are placed off-axis.

Comparing FIGS. 12a and 12b, it is noted that the more radial shift there is, the more serious the offset voltage level change gets.

In on-axis configuration in which two objects are along the radial direction, $\pm 1^{st}$ beams are shifted from the $0^{th}$ beam by ½ TP and the shift amount is fixed with the object lens moving, so that there occurs relatively small amount of offset change. In contrast, in off-axis configuration in which two objects are along the track direction, $\pm 1^{st}$ beams are shifted from the $0^{th}$ beam by ½ TP and the shift amount varies depending on the distance from the center of optical storage, so that there can occur very large amount of offset level change.

Figure 13A:
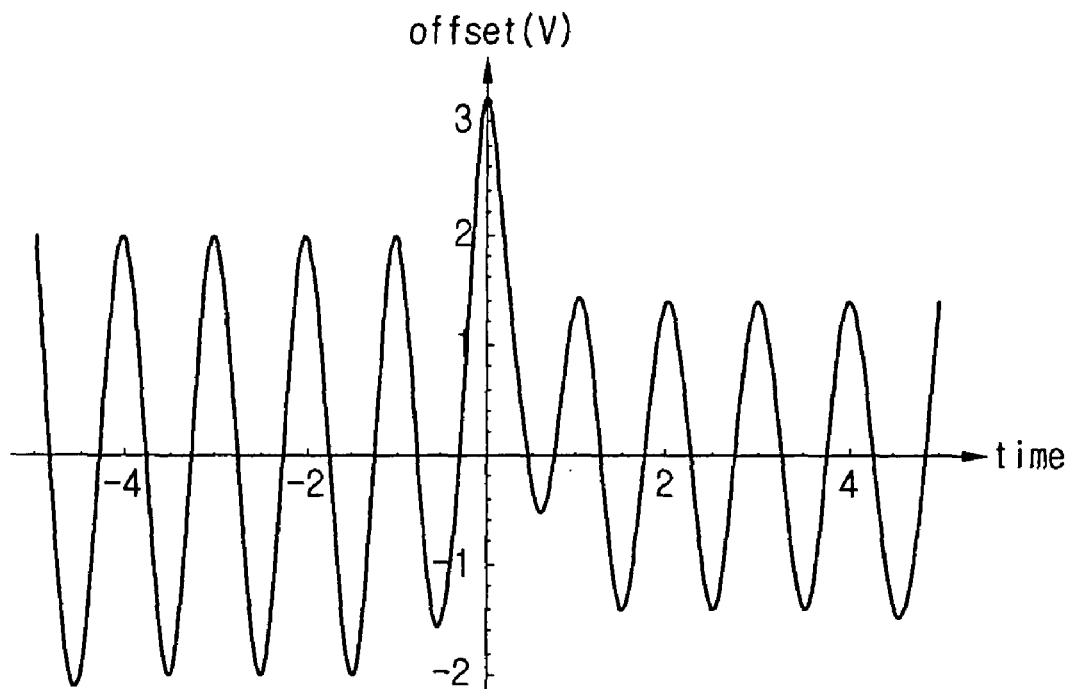
FIG. 13a shows change of offset voltage dependent on time when there is radial shift of object lens by 5 au and sub beam error occurred in which the object lenses are placed on-axis and FIG. 13b shows change of offset voltage dependent on time when there is radial shift of the object lens by 5 au and sub beam error occurred in which the object lenses are placed off-axis.
Figure 13B:
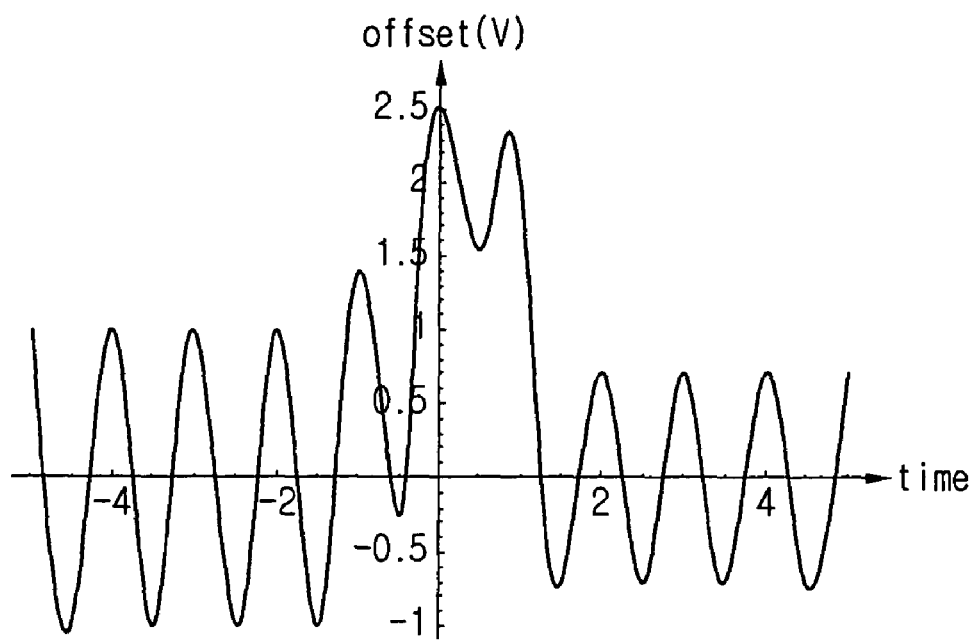

FIG. 13a shows change of offset voltage dependent on time when there is radial shift of object lens by 5 au and sub beam error occurred in which the object lenses are placed on-axis and FIG. 13b shows change of offset voltage dependent on time when there is radial shift of the object lens by 5 au and sub beam error occurred in which the object lenses are placed off-axis.

Comparing FIG. 13a and FIG. 13b, it is noted that there occurs more serious offset voltage level change near t=0 in FIG. 13b than FIG. 13a.

Figure 15:
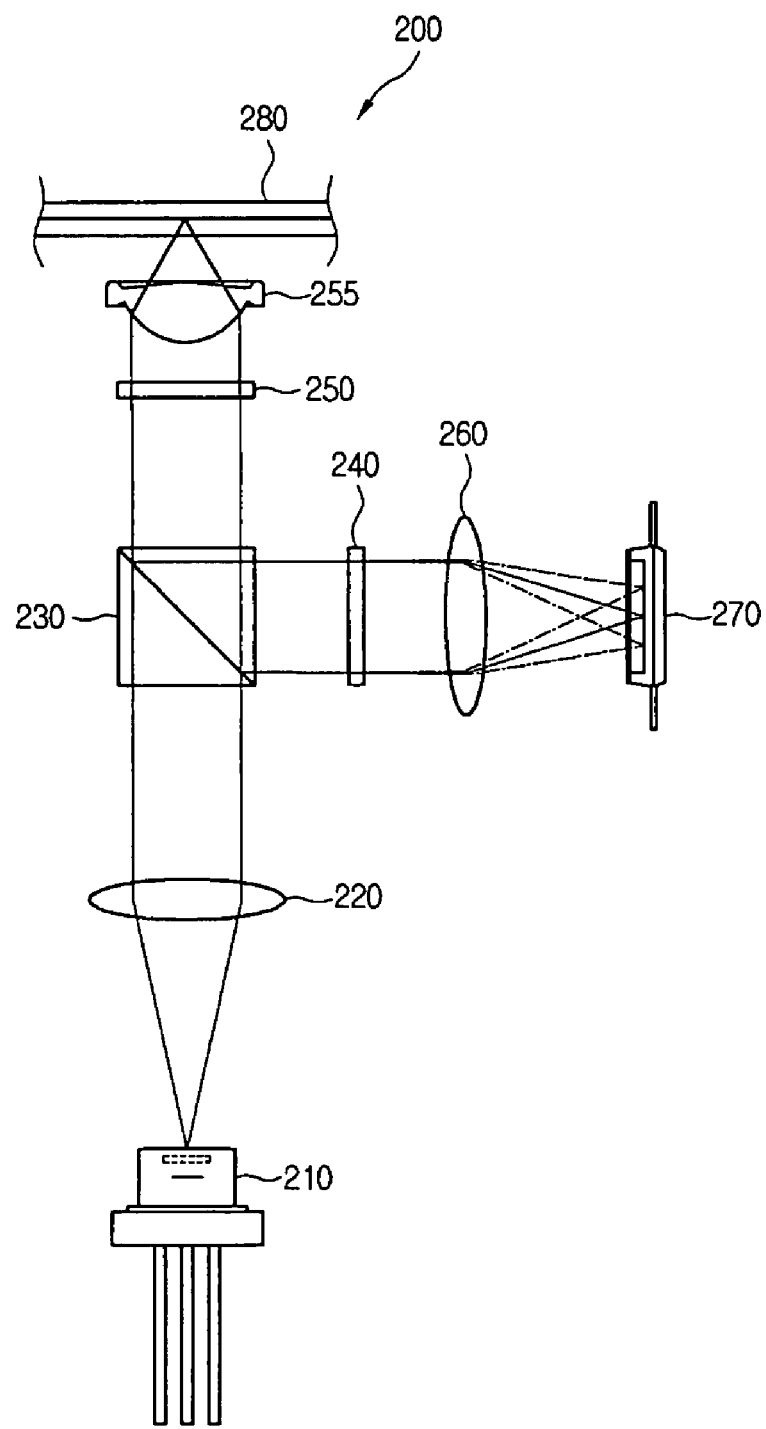
FIG. 15 shows a schematic diagram of an optical pickup 200 according to the second embodiment of the present invention.

FIG. 15 shows change of offset voltage dependent on time detected by using the optical pickup according to the present invention, given the same conditions as those of FIG. 13b measured in an optical pickup according the present invention.

Figure 14:
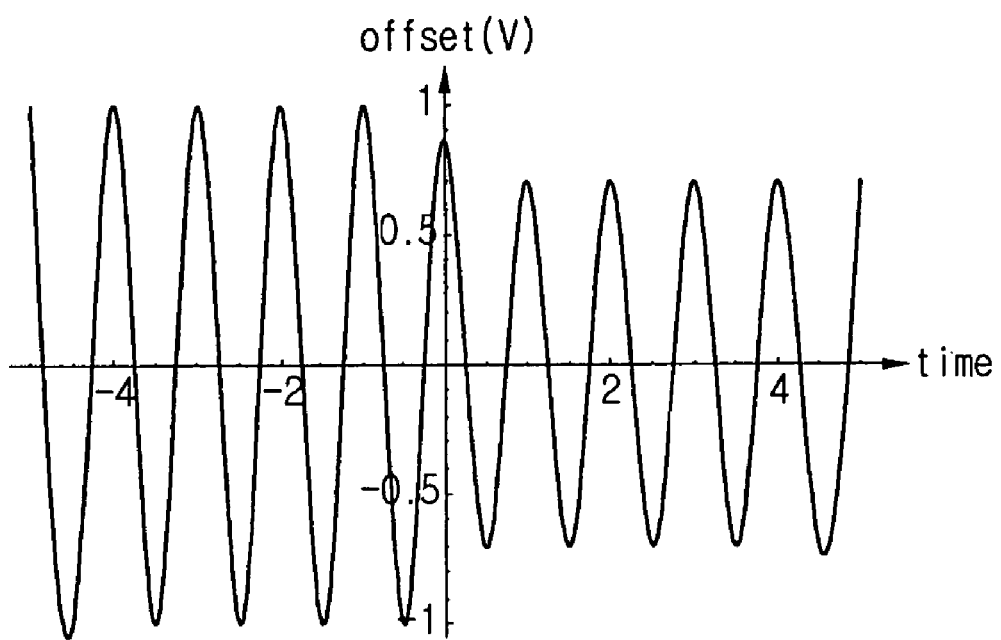
FIG. 14 shows change of offset voltage dependent on time given the same conditions as those of FIG. 13b measured in an optical pickup according the present invention.

Comparing FIG. 14 and FIG. 13a or 13b, it is noted that the amplitude of AC signal is slightly changed at t=0 but there is substantially no offset voltage level change near t=0.

FIG. 15 shows a schematic diagram of an optical pickup 200 according to the second embodiment of the present invention.

Referring to FIG. 15, the optical pickup 200 according to the second embodiment of the present invention comprises light source 210, collimate lens 220, beam splitter 230, wavelength plate 250, object lens 255, diffraction grating 240, condensing lens 260 and light detecting means 270, and an optical storage 280, which may be placed before the object lens 255.

The structure of the second embodiment of the optical pickup of FIG. 15 is similar to the first embodiment of FIG. 1, but is different in that the diffraction grating 240 is positioned between beam splitter 230 and condensing lens 260.

The optical pickup according to the first embodiment of the present invention of FIG. 1 can employ all of three embodiment of diffraction gratings 140a, 140b, 140c, while the optical pickup according to the second embodiment of the present invention of FIG. 15 cannot employ second embodiment of diffraction grating 140b.

Referring to FIG. 5, when there is radial shift of the object lens, i.e. object lens moves along the radial direction, which corresponds to the horizontal direction of the paper in FIG. 5, the first grating pattern region A3 of the second embodiment of diffraction grating 140b can intrude on the second grating pattern region A4. In this case, there may be a significant error in detecting tracking error signal, which makes the second embodiment of the diffraction grating unavailable.

Detailed description regarding other components in FIG. 15 will be the same as that of FIG. 1 and is omitted.

The optical pickup according to the present invention provides the following advantages:

The offset voltage level change can be prevented when off-axis configuration is employed and the object lens moves over the border of unrecorded area and recorded area.

It is possible to alleviate the offset voltage level change without being affected by radial shift, sub beam error etc. and without DPP level and light efficiency being degraded when performing tracking servo over HD DVD, DVD-R, DVD-RW, BD which have different track structures.

What is claimed is:

1. An optical pickup comprising:
a light source configured to emit light;
a beam splitter configured to transmit or reflect light;
an object lens configured to condense the light transmitted by the beam splitter onto an optical storage;
a diffraction grating having a first grating pattern and a second grating pattern, the first grating pattern configured to diffract and divide said light reflected by the optical storage into a main beam and two sub beams, and the second grating pattern configured to diffract said light along a different diffracting direction than the first grating pattern so that the diffracted light by the second grating pattern is excluded from an error detecting process;
a condensing lens configured to generate astigmatism to the light diffracted by the first grating pattern; and
a light sensor configured to receive the light via the condensing lens and detect a tracking error signal; wherein
the first grating pattern has an hour glass shape and is disposed in a central portion of the diffraction grating; and
the second grating pattern covers a remainder of the diffraction grating.

2. An optical pickup comprising:
a light source configured to emit light;
a beam splitter configured to transmit or reflect light;
an object lens configured to condense the light transmitted by the beam splitter onto an optical storage;
a diffraction grating having a first grating pattern and a second grating pattern,
the first grating pattern configured to diffract and divide said light reflected by the optical storage and then reflected by the beam splitter into a main beam and two sub beams, and the second grating pattern configured to diffract said light along a different diffracting direction than the first grating pattern so that the diffracted light by the second grating pattern is excluded from an error detecting process;
a condensing lens configured to generate astigmatism to the light diffracted by the first grating pattern; and
a light sensor configured to receive the light via the condensing lens and detect a tracking error signal; wherein
the first grating pattern has an hour glass shape and is disposed in a central portion of the diffraction grating; and
the second grating pattern covers a remainder of the diffraction grating.

* * * * *